Dec. 10, 1968    L. MARCOUX    3,416,116
THERMOSTATIC SWITCHES
Original Filed Dec. 19, 1960    6 Sheets-Sheet 1

Dec. 10, 1968   L. MARCOUX   3,416,116
THERMOSTATIC SWITCHES
Original Filed Dec. 19, 1960   6 Sheets-Sheet 3

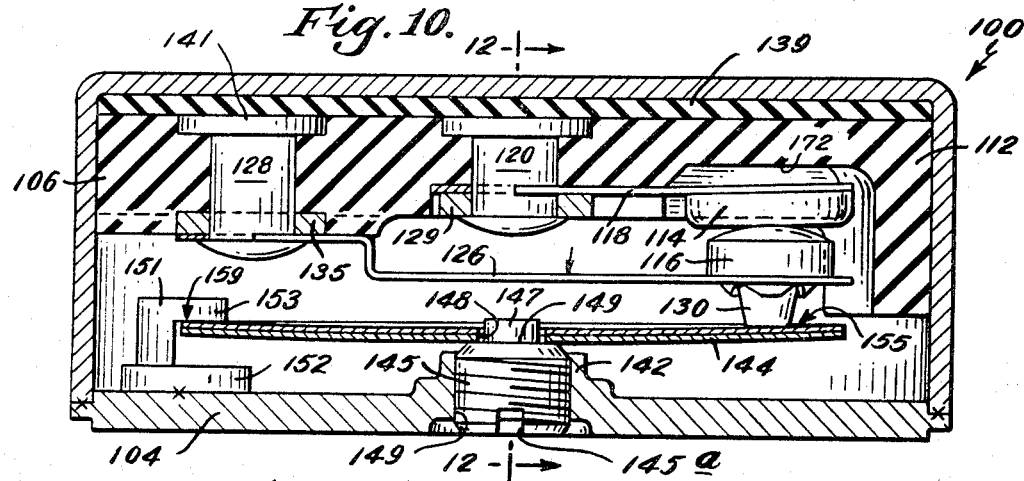

Dec. 10, 1968    L. MARCOUX    3,416,116
THERMOSTATIC SWITCHES
Original Filed Dec. 19, 1960    6 Sheets-Sheet 5

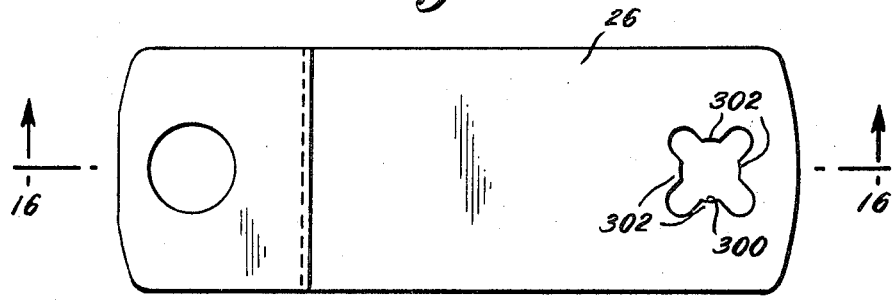
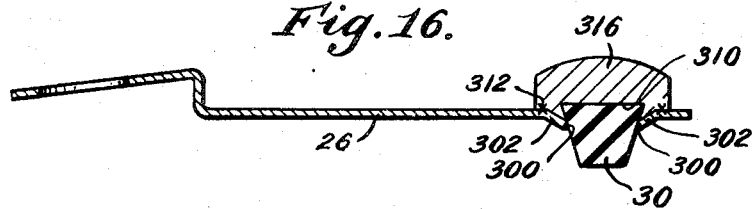
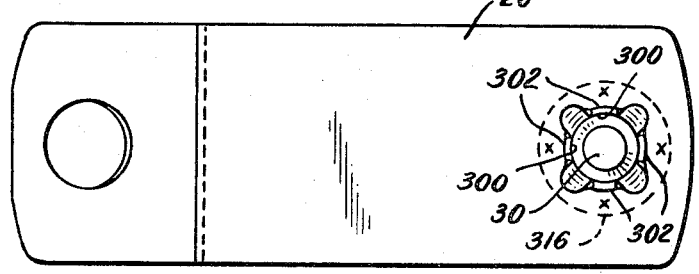

United States Patent Office 3,416,116
Patented Dec. 10, 1968

3,416,116
THERMOSTATIC SWITCHES
Leo Marcoux, Pawtucket, R.I., assignor to Texas Instruments Incorporated, Dallas, Tex., a corporation of Delaware
Original application Dec. 19, 1960, Ser. No. 76,590, now Patent No. 3,240,908. Divided and this application Jan. 24, 1966, Ser. No. 545,180
5 Claims. (Cl. 337—347)

ABSTRACT OF THE DISCLOSURE

A thermostatic switch for opening or closing an electrical circuit on temperature rise including means for effecting calibration of the switch externally of its housing and including spring mounting of the contacts to provide vibration resistance and better contact engagement.

---

This application is a division of application Serial No. 76,590, filed Dec. 19, 1960, now U.S. Patent No. 3,240,908 and assigned to the assignee of the instant invention.

This invention relates to thermostatic switches and improved components thereof, and more particularly, relates to thermostatic switches of the type commonly known as snap-acting, wherein contact operation is effected in response to reversal of curvature of a thermally responsive snap-acting disc.

It is one object of the instant invention to provide an improved, low temperature differential, thermostatic switch which is operable to open or close electrical contacts on a temperature rise.

It is another object of the instant invention to provide a thermostatic switch of the class described, which is reliable and precise in operation.

It is a further object of the instant invention to provide an improved, low-cost, hermetically sealed, thermostatic switch of the class described.

It is yet another object of the instant invention to provide a thermostatic switch of the class described, which includes means for effecting accurate and fine calibration of the switch, which calibration, in at least some of the embodiments, can be effected externally of the switch after assembly of parts therein.

Another object of the invention is to provide a thermally responsive switch which affords low temperature differential, precision operating characteristics, and also provides a relatively large contact opening gap.

It is yet another object of the instant invention to provide a thermostatic switch of the class described, which is simple in construction, low cost and economical to manufacture and assemble.

It is yet another object of the instant invention to provide a thermostatic switch of the class described, which provides vibration and shock resistance.

It is another object of the instant invention to provide a new and improved means and method of dependably securing an electrically insulated member to a support member, such as an electrically conductive, contact-carrying member.

Other objects will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which several of various possible embodiments of the invention are illustrated:

FIG. 10 is a sectional view taken on line 10—10 of FIG. 7;

FIG. 11 is a view similar to FIG. 10, showing relative movement between parts;

FIG. 12 is a sectional view taken on line 12—12 of FIG. 10;

FIG. 15 is a plan view of a blank which forms a contact-carrying arm for the thermostatic switches shown in FIGS. 1–14;

FIG. 16 is a sectional view taken on line 16—16 of FIG. 15, but showing the contact arm assembly and parts thereof in a final assembled condition; and FIG. 17 is a bottom view of the contact arm assembly shown in FIG. 16.

Figure 1:
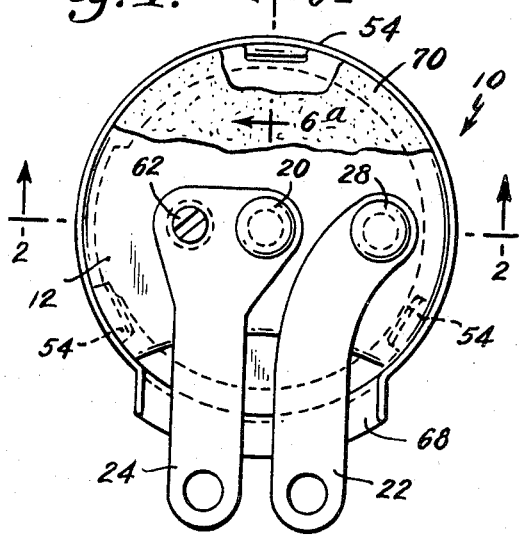
FIG. 1 is a top plan view, with certain parts broken away for clarity of illustration, of a thermostatic switch according to a first embodiment of the invention.

Dimensions of certain of the parts as shown in the drawings have been modified for the purposes of clarity of illustration.

Similar reference characters indicate corresponding parts throughout the several views of the drawings.

The thermostatic switches according to the instant invention are of the type which employ a snap-acting bimetallic member having a dished portion responsible for its snap action. As is well known in the art, such discs "snap through center" rapidly reversing its curvature upon attaining a predetermined temperature. The reversals of curvature of the disc are utilized to actuate the contacts of the switch. The unique construction of the switches according to this invention affords (but is not limited to) lowe temperature differential operation (that is, a relatively small temperature differential between the temperatures at which the thermal element actuates to either open or close the contacts).

The thermostats according to the instant invention are useful for close and accurate temperature control, or as protective or warning devices, for example, for aircraft control components, electronic circuit components, servo mechanisms, crystal ovens, surface heaters, electric blankets, and other applications requiring narrow temperature differential operation and high reliability.

Figure 2:
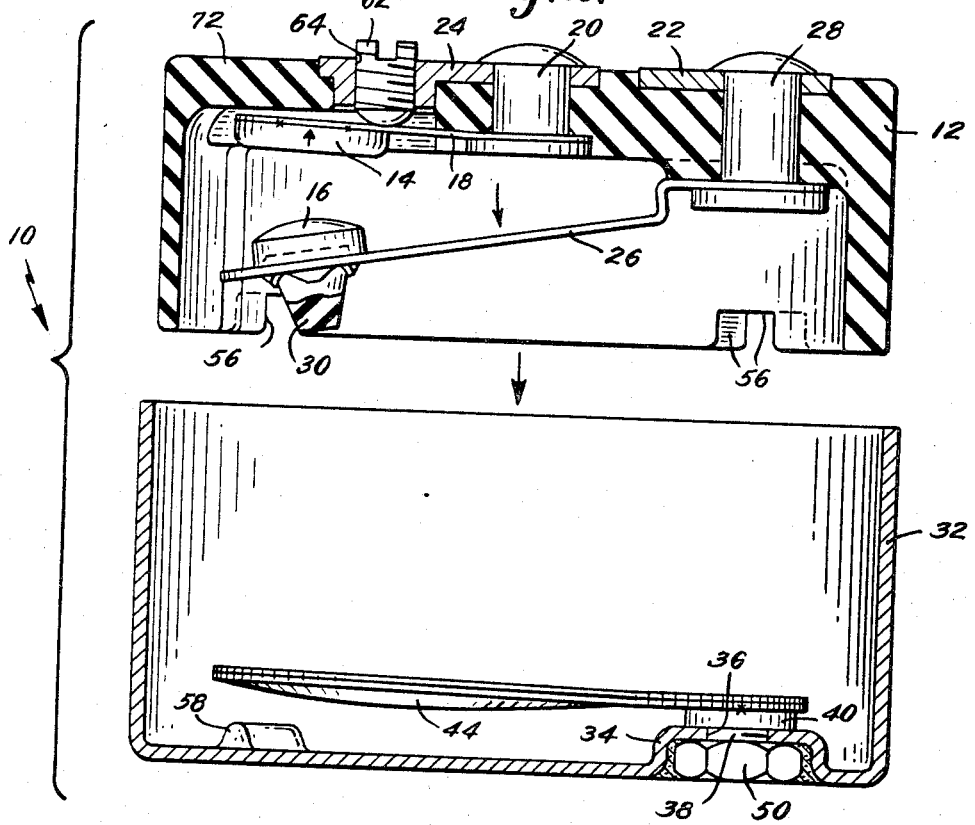
FIG. 2 is an exploded sectional view taken on line 2—2 of FIG. 1.
Figure 4:
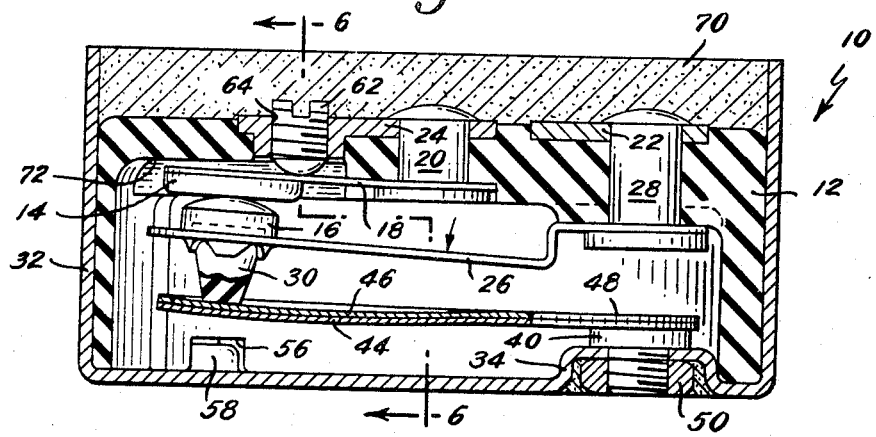
FIG. 4 is a sectional view similar to FIG. 2, showing the parts in final assembled relation.

Referring now more particularly to the drawings, there is shown at numeral 10, a thermostatic switch according to a first embodiment of the instant invention. Electrical switch 10, as best seen in the exploded view of FIG. 2, comprises two subassembly units, generally referred to by numerals 11 and 31. Subassembly 11 includes an open-ended cup-shaped base member 12, formed of electrically insulating material such as, for example, one of the phenolic thermosetting resins. Subassembly 11 also includes a pair of electrical contacts 14 and 16. Electrical contact 14 is mounted on an electrically connected (as by welding or the like) to a flexible contact-carrying spring arm 18. Contact arm 18 is cantilever mounted on and secured to base 12 by a rivet 20, as best seen in FIGS. 1, 2 and 4. Contact-carrying arm 18 comprises a spring member formed of an electrically conductive material such as, for example, beryllium copper, and is biased for movement of contact 14 in a direction away from contact 16, as shown by the arrow in FIG. 4.

Figure 3:
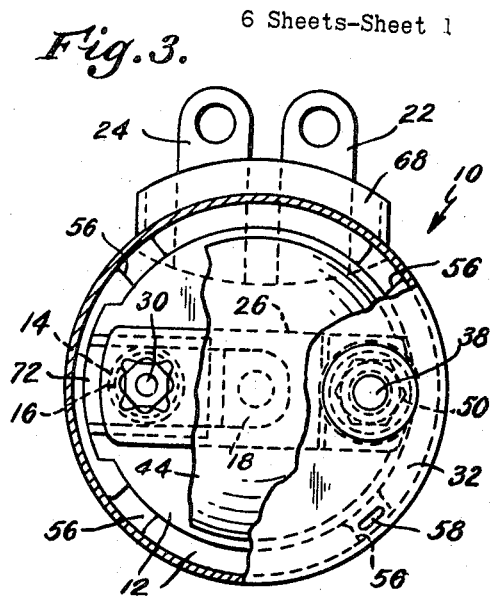
FIG. 3 is a bottom plan view of the switch shown in FIG. 1, with portions of the casing and switch structure broken away for clarity of illustration.

Subassembly 11 further includes electrically conducting terminals 22 and 24, which (as best seen in FIGS. 1 and 3) extend exteriorly of the switch. Each of terminals 22 and 24 are supported on and received within suitably formed cavities provided in the upper portion of cup-shaped base 12, as best seen in FIGS. 2 and 4. Rivet 20 serves to firmly mount electrical terminal 24 on cup-shaped base 12, and also to electrically connect terminal 24 with contact-carrying arm 18.

Electrical contact 16 is electrically connected to and carried by a flexible electrically conductive spring arm 26 formed, for example, of beryllium copper. Spring arm 26 is cantilever mounted on cup-shaped casing 12, and is electrically connected to terminal 22, by means of rivet 28, as clearly shown in FIGS. 2 and 4. Contact-carrying arm 26 also has mounted thereon a tapered, insulating abutment member 30. Tapered, insulating abutment member 30 is tightly mounted within an aperture formed in contact-carrying arm 26 and a cavity formed in electrical contact 16, in a manner to be described in greater detail below. Tapered, insulating member 30 is formed of an electrically insulating material such as, for example, glass, a ceramic or a phenolic resinous thermosetting material.

Subassembly 31 comprises a metallic cup-shaped housing member 32, within which subassembly 11 is received, as best shown in FIGS. 2 and 4. Cup-shaped housing member 32 interfits with cup-shaped insulating casing member 12 in relatively close interfitting and mating engagement to seal the open end of cup-shaped member 12, and to place the parts in final assembled relation, as will be described in greater detail below.

Cup-shaped member 32 is formed of a good thermally conductive material, such as stainless steel or the like. Casing 32 provides a raised boss portion 34, which may be formed by stamping or the like. Boss portion 34 is provided with an aperture 36, in which is received the threaded shank portion 38 of a stud 40. Subassembly 31 further includes a snap-acting composite thermostatic disc or element 44, which may be formed, for example, of a bimetallic material provided with a dished portion 46 responsible for its snap action, in a manner well known in the art. Snap-acting member 44 may, for example, be of the type shown in U.S. Patent No. 1,448,240. Since the operation of such composite snap-acting discs or elements is well known in the art, no further description will be given herein.

Snap-acting member 44 is cantilever mounted on casing 32 by means of stud 40, as best seen in FIGS. 2–5. Portion 48, adjacent the periphery of disc 44, is mounted on stud 40, as by welding. Disc 44 and stud 40 are prepared as a subassembly unit, which is mounted on casing 32 by inserting and disposing threaded shank portion 38 within aperture 36, and into threaded engagement with a nut 50, as shown, to maintain the parts in tightly assembled relation. Thereafter, a potting compound 52, which may, for example, be an electrically insulating and sealing epoxy resin, is applied about nut 50 to seal and retain the parts in fixed assembled relation.

Each of subassembly units 11 and 31 may advantageously be mass produced as separate subassemblies, and can quickly and easily be assembled by slidably inserting subassembly unit 11 within subassembly unit 31. The lower wall portion of cup-shaped member 12, adjacent its open end, is provided with a plurality of circumferentially spaced notches 56, as best seen in FIGS. 1–4. Notches 56 mate and interfit with similarly spaced projections 58 (see FIGS. 4 and 6) provided by casing member 32 to orient and align the parts for proper assembled relation, and to facilitate assembly of the subassemblies 11 and 31.

In order to achieve maximum utilization of the disc motion adjacent member 30 for contact actuation, it is preferred that the upper surface of the peripheral portion of disc 44 which is engaged by member 30 and portion 48 of the disc, lie in a theoretical line which passes through the center of the disc or member 44.

Figure 5:
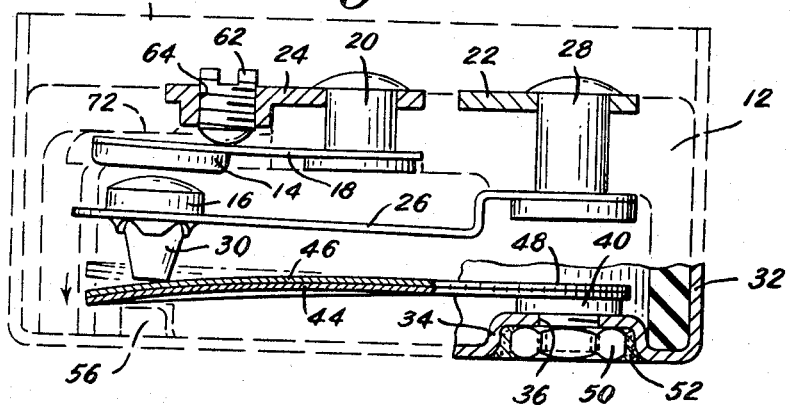
FIG. 5 is a view similar to FIG. 4, showing relative movement between parts.
Figure 6:
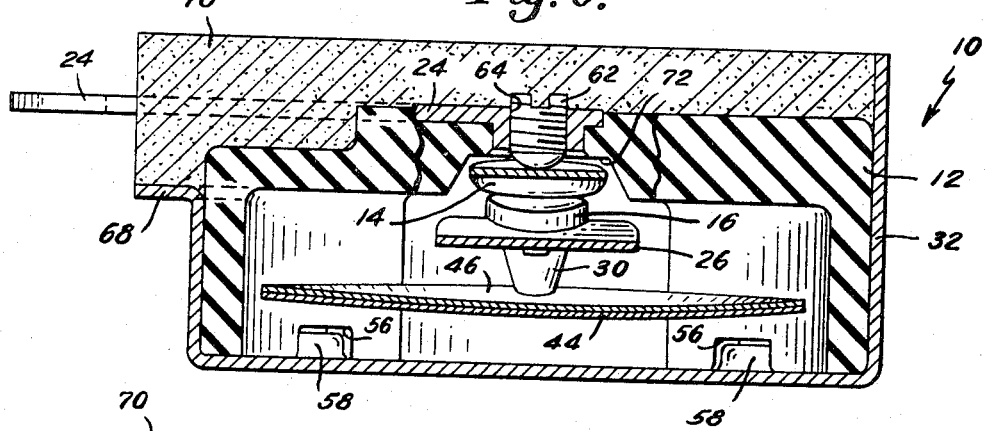
FIG. 6 is a sectional view taken on line 6—6 of FIG. 4.
Figure 6A:
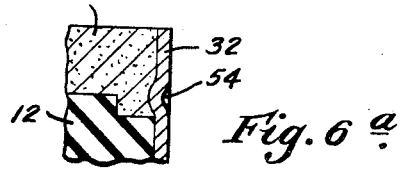
FIG. 6a is a detail view showing one point of securement between the casing and cup member, taken on line 6a—6a of FIG. 1, and oriented in the position of the switch shown in FIGS 4–6.

Subassemblies 11 and 31 may be maintained in fixed, assembled relation, as by crimping casing 32 about cup-shaped member 12 as at 54, at circumferentially spaced points on casing 32, as best seen in FIG. 6a. When the subassemblies 11 and 31 are assembled, as shown in FIGS. 4–6, abutment member 30 engages a portion of disc 44 adjacent the peripheral free end thereof. Spring member 26 urges abutment member 30 into constant engagement with disc 44 (in both the contacts-closed and contacts-open positions) and also urges contact 16 for movement in a direction away from contact 14; as shown by the arrow in FIG. 4. When the disc 44 is in the solid-line position shown in FIG. 4, contacts 14 and 16 are maintained in a contacts-closed position against the bias exerted by spring member 26. When disc 44 reaches a predetermined temperature condition, it will snap from the solid-line position shown in FIG. 4 (and in dashed lines in FIG. 5) to the solid-line position shown in FIG. 5 to open contacts 14 and 16. The switch in the embodiment of FIGS. 1–6 (as well as the remainder of the embodiments to be described below) can be made so as to open or close contacts 14 and 16 in response to a predetermined temperature rise, depending upon the specific application requirements. Contacts 14 and 16 may thus be normally open or normally closed.

Subassembly 11 of thermostatic switch 10 further includes adjustable calibrating means which provides precise, accurate and very fine calibration adjustment for the thermal device, so as to achieve desired low temperature differentials. The calibration and adjusting means comprises an adjusting screw 62 which is received within a threaded aperture 64 provided in terminal 24, as shown. The lower end of adjusting screw 62 engages the upper surface of flexible contact-carrying spring arm 18, as best seen in FIG. 4. It will be clear that suitable rotation of screw 62 will urge contact 14 and spring arm 18 downwardly against contact 16 and against disc 44 44 through insulating member 30, to effect desired calibration of the switch.

The fine calibration afforded by the thermostatic switches according to the instant invention permits setting of the temperature differential to as little as a 2° F. temperature differential. The adjusting and calibrating means of switch 10 also advantageously permit calibration of the switch after subassemblies 11 and 31 have been assembled in a final assembled relation.

Casing 32 is provided with a sidewall opening 68, as best seen in FIGS. 1, 3 and 6. Terminals 22 and 24 are disposed within sidewall opening 68, and extend therethrough to the exterior of the switch for connection to electrical leads. After the parts of the switch have been assembled, and calibration through screw 62 has been effected, a sealing compound 70 is applied to the open end of casing 32 to hermetically seal the parts in final, assembled calibrated relation. Sealing compound 70 may, for example, be an electrically insulating epoxy resin. Such electrically insulating epoxy resins generally have a relatively poor thermal conductivity, which characteristic cooperates with cup-shaped casing 12 to provide a unique advantage, as will be described in greater detail below.

The metal casing 32 is in good heat transfer relation with the thermally responsive disc 44, and advantageously affords a thermostatic switch construction which can quickly sense and closely approximate the temperature of the device to be controlled or protected.

In those applications wherein the metallic casing 32 of switch 10 is mounted in contact with or in close thermal juxtaposition to the device whose temperature is to be sensed (such as, for example, in a casting well or through an opening in a metallic enclosure) and the sealed portion 70 of the switch is exposed to the ambient, switch 10 provides the advantage of retaining substantially all of the heat transferred to the switch (by the device whose temperature is being sensed) in the switch to provide quicker and more accurate and precise temperature control or sensing. In the applications described above, the sealing compound 70 and electrically insulating cup 12 co-operate to prevent, or at least minimize, dissipation of heat from the switch 10 so as to provide the advantages discussed above.

The flexible mounting of contact 14 on spring arm 18 advantageously provides a wiping and shearing action to break apart welds and clean the contacting surfaces to break apart or remove oxide films and other deleterious surface formations upon closing of contacts 14 and 16, when movable contact 16 is moved into engagement with contact 14, in response to force developed by snapping of disc 44 (i.e. from the position shown in solid lines in FIG. 5 to the dashed-line position in FIG. 5 and solid-line position in FIG. 4), contact 14 is moved upwardly by contact 16, which movement is permitted by spring arm 18. Contact 14, in flexing about screw 62 as a fulcrum, advantageously provides the wiping and shearing action described above.

The flexible mounting of contact 14, in addition to providing the wipe and shear advantages described above, also uniquely provides for override capacity. Upper surface casing 72 adjacent contact 14, is spaced sufficiently from contact 14 to permit substantial movement of contact 14 upwardly (as seen in FIG. 4) to pivot or flex about adjusting screw 62 as a fulcrum under the force exerted by snap-acting disc 44, upon and also after closing of the contacts to provide for override capacity.

The override capacity feature is particularly important and advantageous in those applications where switch 10 is of the type in which the contacts close on a temperature rise or are normally open. When the thermostatic disc 44 is subjected to increasing temperatures (after closing of the contacts) which will cause further movement or flexure of disc 44 in a direction to further close the contacts, contact 14 will continue to flex upwardly (as seen in FIG. 4) and relieve or prevent the creation of undesirable stresses in the disc 44 which might otherwise be encountered if contact 14 were immovably or fixedly mounted. Switch 10 can thus advantageously override to higher temperatures (for example, as high as 325° F.) without creating undesirable stresses which could permanently deform the disc or deleteriously shift or alter the calibration of the disc (as might otherwise be the case with a fixedly mounted contact 14). This feature is also advantageous in switches where the contacts close on a temperature drop or open on a temperature rise, although not as important as with the reverse situation where the contacts close on a temperature rise.

As can best be seen in FIG. 4, the adjusting screw 62 engages the upper side of contact arm 18 adjacent the edge of and is stiffened by contact 14 to advantageously assure accurate adjustment and assure that the desired contact gap between contacts 14 and 16 will remain constant during operation. It should be understood that engagement of the screw 62 with the contact arm 18 is spaced far enough from the center line of the contact 14 so as to readily permit flexing of the contact 14 and arm 18 about screw 62 in a clockwise direction (as seen in FIG. 4) to provide the override and the wipe and shearing features described above.

Switch 10 advantageously provides for improved shock and vibration resistance, is versatile and susceptible to varying, adjustable temperature settings over a wide range of temperatures (e.g. ranging from −65° F. to 270° F.) and can be calibrated for a temperature differential of as little as 2° F. The cantilever mounting of the disc and utilization of motion produced thereby adjacent the free end of the disc advantageously permits obtaining of large contact opening gaps while still maintaining relatively narrow temperature differentials.

*Embodiment of FIGS. 7–12*

Referring now to FIGS 7–12, there is shown at numeral 100, a thermostatic switch according to a second embodiment of the instant invention. Thermostatic switch 100 is similar in some respects to thermostatic switch 10, provides many of the advantages afforded by switch 10 described above, and also affords additional advantages, as will be pointed out in greater detail below.

Thermostatic switch 100, like switch 10, is suitable for low temperature differential use, and is useful in many and varied applications, including those mentioned above in connection with thermostatic switch 10.

Referring now more particularly to the drawings, switch 100 includes a metallic, cup-shaped, open-ended casing member 102, and a metallic cover member 104.

Figure 8:
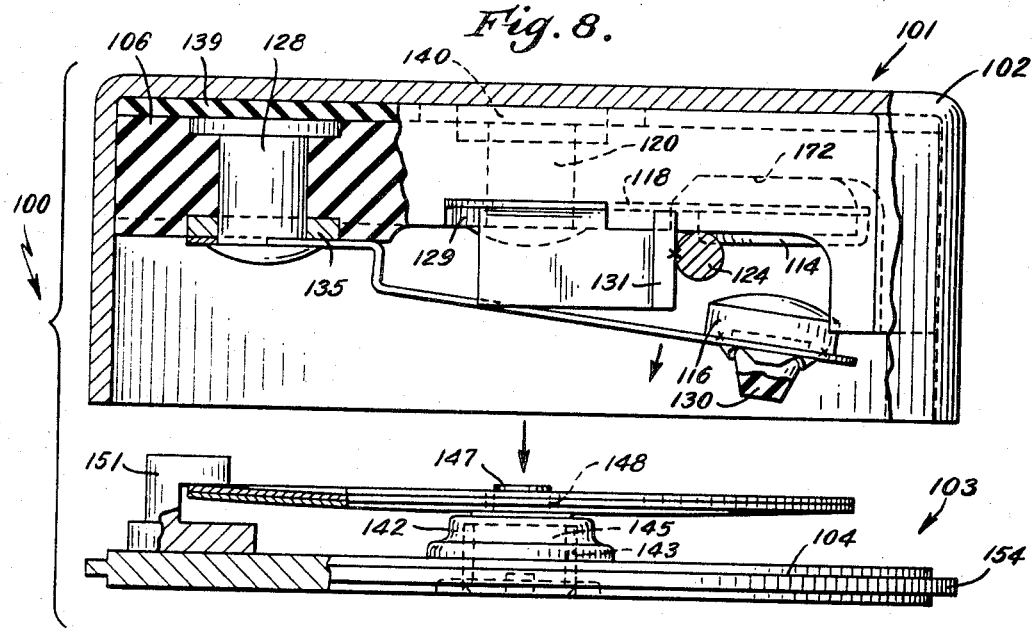
FIG. 8 is an exploded sectional view taken on line 8—8 of FIG. 7.

As best seen in FIG. 8, switch 100 comprises two subassemblies, generally referred to by numerals 101 and 103. Subassembly 101 includes a base member 106, formed of an electrically insulating material, such as, for example, one of the phenolic thermosetting resins. Subassembly 101 includes a pair of electrical contacts 114 and 116. As best seen in FIGS. 10 and 11, electrical contact 114 is mounted on and electrically connected to a contact-carrying arm 118, as by welding or the like. Contact arm 118 (analogous to contact arm 18 of switch 10) is mounted on and secured to base 106 by means of a rivet 120. Surface 172 of base member 106 is spaced sufficiently from contact 114 to permit substantial movement and flexing of contact arm 118 and contact 114 to provide the override and wipe and shear features described above in connection with thermostatic switch 10.

Figure 7:
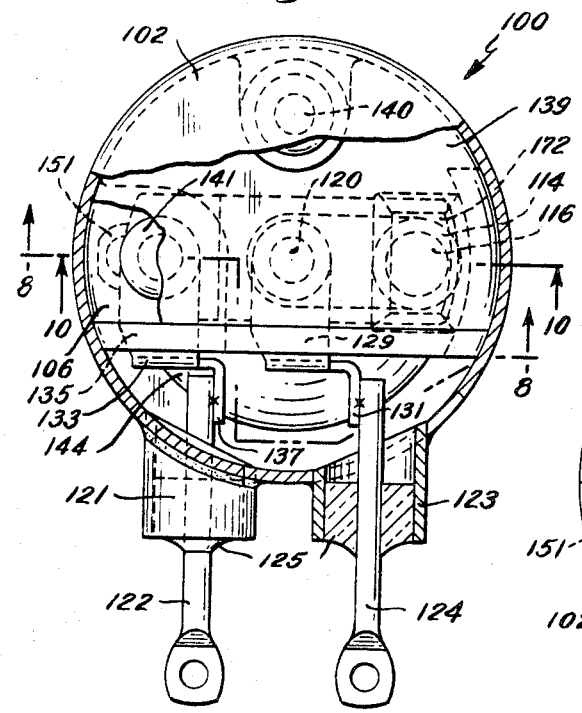
FIG. 7 is a top plan view of a thermostatic switch according to a second embodiment of the instant invention, with parts of the casing and switch broken away for clarity of illustration.
Figure 9:
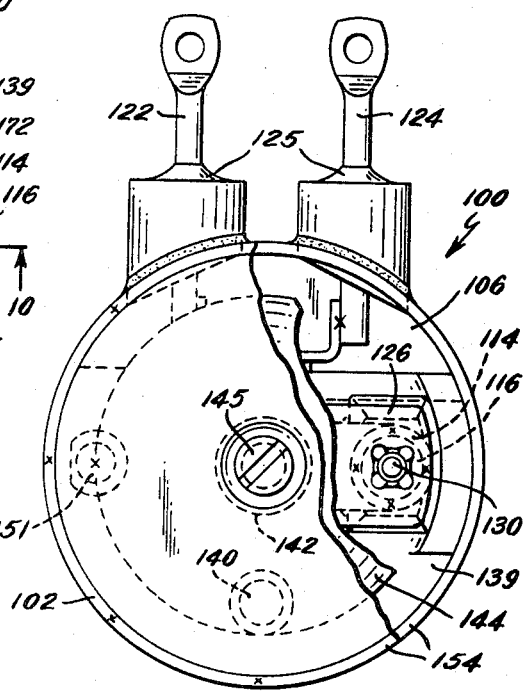
FIG. 9 is a bottom plan view of the switch shown in FIG. 7, with portions of the casing and swtich broken away for clarity of illustration.

Subassembly 101 further includes a pair of electrically conductive terminals 122 and 124 which, as best seen in FIGS. 7 and 9, extend exteriorly of the switch. Each of terminals 122 and 124 are received within open-ended, exteriorly extending tubular projections 121 and 123, each of which are formed integrally with casing member 102. Each of terminals 122 and 124 are respectively retained in their tubular housing portions 121 and 123 by means of an electrically insulating hermetic sealant 125, the substance therefor being, for example, glass, ceramic or the like, glass being preferred. Sealant 125 serves to position terminals 122 and 124 within tubular extensions 121 and 123 and maintain them in hermetically sealed, spaced, electrically insulated relation with respect to casing 102.

Electrical contact 114 is electrically connected to terminal 124 through an electrically conductive member 127. Electrically conductive member 127 includes a leg portion 129, which is electrically connected to contact arm 118 through rivet 120, as best seen in FIGS. 7 and 10. Another leg 131 formed integrally with member 127 (see FIGS. 7 and 12) is electrically connected to terminal 124, as by welding. Rivet 120 thus serves to firmly cantilever mount contact arm 118 on the insulating base member 106, and also to electrically connect terminal 124 with contact-carrying arm 118, through member 127. Contact-carrying arm 118 (like contact arm 18 of switch 10) comprises a spring member formed of an electrically conductive material such as, for example, beryllium copper, and is biased for movement of contact 114 in a direction away from contact 116, as shown by the arrow in FIG. 10.

Electrical contact 116 is carried by and electrically connected to an electrically conductive spring arm 126, which is or may be identical to spring arm 26 of switch 10, and also mounts a tapered electrically insulating abutment or motion-transfer member 130 (analogous to member 30). Spring arm 126 is mounted on electrically insulating base member 106 by means of rivet 128, and is electrically connected to terminal 122 through an electrically conductive member 133, which may be substantially the same as member 127. Member 133 includes a leg portion 135, which is electrically connected to contact-carrying arm 126 and firmly mounted on base 106 by means of rivet 128 (see FIGS. 7 and 10). Electrically conductive member 133 also includes a leg 137 formed integrally therewith, which is electrically connected to terminal 122 (see FIG. 7) as by welding.

The upper portions of electrically conductive rivets 120 and 128 are received in suitable recesses formed in insulating base 106 (as best seen in FIG. 10). A layer of electrically insulating material 139 is disposed over the upper surface of electrically insulating base 106 and rivets 120 and 128, to electrically isolate the latter from the metallic, electrically conductive casing 102.

In practice, base 106, contact arm 118, contacts 114 and 116, contact arm 126, electrically conductive members 127 and 133, may all be preassembled into a subassembly. Base 106 is also provided with a rivet 140, having a flange 141, which is welded to casing 102 (see FIG. 12) to retain the casing, base and insulating layer 139 in fixed, assembled relation. Thereafter, terminals 122 and 124, which have hitherto been mounted in their respective tubes 121 and 123 by the glass sealant 125, are respectively welded to portions 137 and 131 of the electrically conductive members 127 and 133 so as to complete the subassembly 101, as shown in FIG. 8.

Subassembly 103 comprises cover member 104 and a centrally located, raised boss portion 142 formed therein, for example, as by punching or stamping. Boss portion 142 provides a threaded aperture 143 within which is received a threaded mounting post 145. Threaded mounting post 145 includes a projecting, reduced diameter portion 147 and an annularly extending shoulder portion 149 surrounding said reduced diameter portion 147. Threaded mounting post 145 also includes a notched portion 145a which is accessible exteriorly of cover 104 (and of the switch 100), for reception of a tool therein to effect calibration of the switch.

Subassembly 103 further includes a snap-acting thermostatic disc 144, which is or may be similar to snap-acting disc 44 described above for switch 10. The central portion of disc 144 is provided with an open-ended aperture 148 within which reduced diameter projecting portion 147 of mounting post 145 is loosely received. A portion of the lower surface of the disc 144 (as seen in FIGS. 10–12) adjacent aperture 148 therein, rests on and is supported by the annularly extending shoulder portion 149 provided on mounting post 145. Aperture 148 is sufficiently larger than reduced diameter projection 147 to permit the disc 144 to be loosely supported on mounting post 145 and to pivot thereabout.

Subassembly 103 also includes a disc retainer member 151 having a base 152 which is securely fastened to cover member 104, as by welding. Disc retainer 151 includes a projecting L-shaped member secured to base 152 extending along an edge of disc 144. Leg 153 of retainer 151 overhangs and engages the upper surface (as seen in FIG. 10) of a portion 159 of the disc adjacent the edge or periphery of the disc. Disc retainer 151, by engaging the upper surface of the disc at the edge thereof closing adjacent to its periphery, provides for maximum utilization of the disc motion produced at the opposite end 155 of the disc which engages electrically insulating motion-transfer device 130 to effect actuation of the contacts when subassemblies 101 and 103 are in final assembled relation. In order to obtain maximum utilization of disc motion at portion 155 for contact actuation, it is preferred that portions 159 and 155 lie in a theoretical line which passes through aperture 148 at the center of disc 144. Subassembly 103 is joined to subassembly 101 by joining flange 154 of the cover member to casing 102, as by heliarc welding to hermetically seal the switch within casing 102 and place the parts in final assembled relation.

Spring member 126 biases contact 116 for movement in a direction away from contact 114 and for movement of insulating, motion-transmitting member 130 into constant engagement with portion 155 of disc 144, as shown by the arrow in FIG. 10. The spring force exerted by spring member 126, in urging insulating motion-transmitting member 130 into constant engagement with the disc 144, as at part 155 thereof, tends to pivot disc 144 about mounting post 145 (as a fulcrum) to urge opposite peripheral portion 159 into contsant engagement with the under surface of portion 153 of disc retainer 151, as best shown in FIGS. 10 and 11. This arrangement advantageously permits obtaining maximum contact gap between contacts 114 and 116 when disc 144 snaps to the solid-line position shown in FIG. 11 (the contacts opening under the bias of spring member 126) with substantially full utilization being made of the leverage afforded by the disc through its loose mounting on mounting member 145 and restraint by member 151. It should also be noted that the mounting of disc 44 leaves the disc free to rotate about reduced diameter portion 147 to provide for equalizing of the wear on its surfaces and stress build-up in the disc.

After the subassemblies 101 and 103 have been assembled, as shown in FIG. 10, adjustable mounting post 145 is rotated to effect desired calibration of the switch. After the device has been calibrated to the desired setting, the exterior opening which surrounds the external part of the adjustable mounting stud 145, may be sealed, as with a solder, or can be brazed or welded to retain the parts in final assembled calibrated relation.

Thermostat 100 provides substantially all of the advantages described above for switch 10 with regard to affording a low-cost device which may be economically produced and assembled, and which affords a low differential setting, hermetically sealed miniaturized device, which can be very finely adjusted and calibrated to provide a wide variety of desired operating characteristics. The loose mounting of thermostatic element 144 is particularly advantageous in providing a switch having excellent vibration and shock resistance.

The particular configuration in extending the terminals 122 and 124 through tubular portions 121 and 123 at the side of casing 102 contributes to permitting minaturization of the device and particularly to maintaining a minimum height allowance for the device. Switches according to each of the embodiments of the instant invention, for example. have been made as small as .650″ in diameter with a height of as little as .315″.

Figure 14:
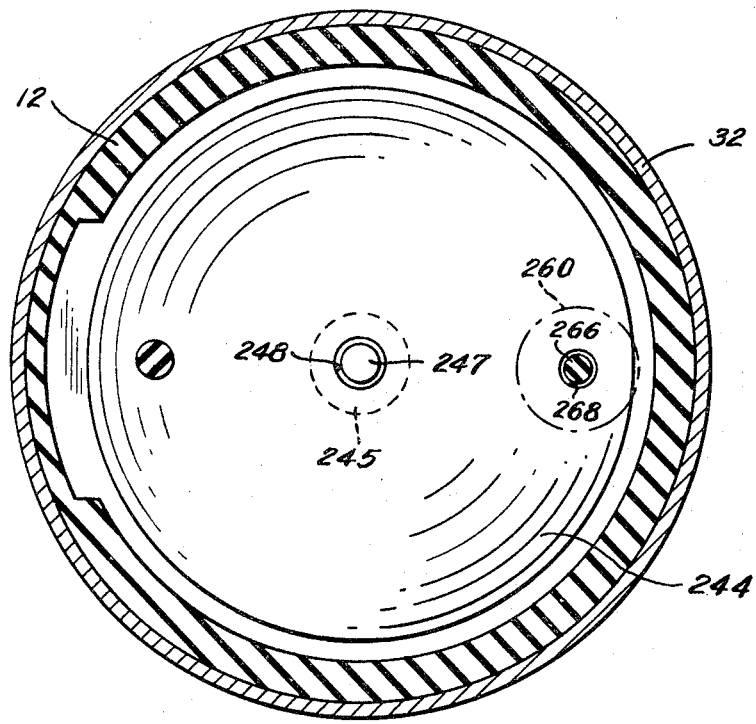
FIG. 14 is a sectional view taken on line 14—14 of FIG. 13.
Figure 13:
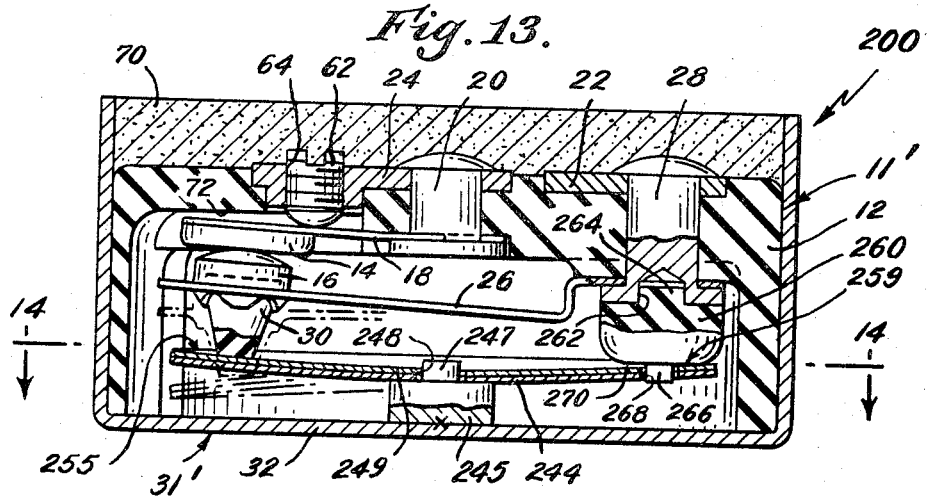
FIG. 13 is a sectional elevational view (similar to FIGS. 4 and 10) of a thermostatic switch according to a third embodiment of the instant invention.

*Modification of FIGS. 13 and 14*

In FIG. 13 is shown a third embodiment of the instant invention generally referred to by numeral 200, which is similar to that shown in the FIGS. 1–6 embodiment, to the extent shown by corresponding reference numerals in FIG. 13, and to that extent, repetition of description will not be necessary.

Generally, thermostatic switch 200 includes two subassembly units 11′ and 31′ which correspond to, and may be substantially identical to, subassembly units 11 and 31 of thermostatic switch 10, except as hereinafter noted.

In this modification, the form of mounting for the thermostatic disc 244 (analogous to thermostatic disc 44 of the FIG. 1 form, and disc 144 of the FIG. 7 form) is modified. Metallic can or housing member 32 has a mounting stud 245 centrally located and secured (as by welding) to the interior of the lower wall of the casing 32, as shown. Mounting stud 245 includes a reduced diameter projecting portion 247 which is loosely received within aperture 248 provided in snap-acting thermostatic disc 244 (analogous to disc 144 of switch 100) to loosely mount snap-acting member 244 in a manner similar to that described above in connection with threaded mounting stud 145 of thermostat 100. Mounting stud 245 further includes an annularly extending shoulder portion 249 (analogous to shoulder 149 of switch 100) which supports the lower surface of thermostatic disc 244 (as seen in FIG. 13).

Subassembly 11' of switch 200 differs from subassembly 11 of switch 10 in the provision of an electrically insulating abutment or retainer member 260. Member 260 may be formed of an electrically insulating material such as, for example, a phenolic resin or a ceramic material. Rivet 28 is provided with a tapered aperture 262, in which is received, by a force fit, an oversize projection or shank 264, provided by member 260, to tightly mount insulating abutment member 260 on rivet 280. The free end of member 260 is provided with a reduced diameter projecting portion 266, which is loosely received within an oversize aperture 268 provided in a portion 255 of disc 244 adjacent the periphery thereof, corresponding to portion 155 of snap-acting element 144.

Abutment 30, which is biased for movement downwardly, as seen in FIG. 13, into constant engagement with the peripheral portion of the disc, by spring member 26, urges disc 244 to pivot about mounting stud 245 in a counterclockwise direction, as seen in FIG. 13, to move the upper surface of portion 255 of disc 244 into constant engagement with surface 270 of abutment member 266. The upper surface (as seen in FIG. 13) of portion 255 is maintained and urged into constant engagement with surface 270 of abutment means 260, when the disc is either in a contacts-closed position shown in solid lines in FIG. 13 or a contacts-open position as suggested by the dashed lines in FIG. 13. In order to achieve maximum utilization of the disc motion adjacent member 30 for contact actuation, it is preferred that the upper surface portions of disc 244 engaged by member 30 and surface 270, lie in a theoretical line which passes through aperture 248 at the center of the disc 244.

Subassemblies 31' and 11' are assembled in substantially the same way as that described above for subassemblies 11 and 31 in the embodiment of FIGS. 1–6. After suitable adjustment and calibration have been effected by adjusting screw 62, the parts are hermetically sealed together and maintained in fixed, assembled relation by an epoxy material 70, as shown.

Abutting member 260, in co-operating with the disc 244 at an area closely adjacent the periphery of the disc, advantageously affords maximum leverage and movement of the disc to provide a maximum contact opening gap, and additionally, projection 266 provides a means for expediting alignment and assembly of the disc in subassembly 31'.

Thermostatic switch 200 provides substantially all of the advantages described above in connection with thermostats 10 and 100. It is also pointed out that it is within the purview of the instant invention to replace the center hole in the disc, in the FIGS. 7–12 and 13 and 14 forms, by a hemispherical depression (not shown) to accommodate a particular disc-forming technique, such as might be employed. The disc would then mount on a hemispherically tipped mounting screw or post to provide substantially the same advantages of the FIGS. 7–12 and 13 and 14 forms described above.

*Contact arm assembly FIGS. 15–17*

FIGS. 15–17 show the details of mounting an electrically insulating motion-transmitting member on a contact arm assembly, such as that employed throughout all of the embodiments described above. Such motion-transfer or abutment members are generally formed of electrically insulating materials (such as that of pin 30 of switch 10) and are difficult to mount on contact arms which are generally formed of electrically conductive spring-type metallic materials. The difficulties are encountered in providing a simple and inexpensive means of reliably securing such parts together in a tight, permanent, final assembled relationship wherein the parts will not move relative to each other during operation, so as to avoid undesirable calibration shifts and changes in operating characteristics of the switch or thermostatic member. The instant invention advantageously solves these problems, and provides other advantages, as will be clear from the ensuing description.

Referring now to FIG. 15, a portion of a blank which forms a contact arm 26 (analogous to contact arms 26, 126 and 226, respectively of thermostatic switches 10, 100 and 200) is shown therein. Contact arm 26 is provided with an aperture 300, and with a plurality of spaced, annularly arranged, deformable fingers are tabs 302, which extend radially inwardly from the circumferential periphery of aperture 300. In practice, aperture 300 and deformable fingers 302 may be formed in a single step, as by punching or stamping.

Electrical contact 16 (analogous to contacts 116 and 216 respectively of switches 100 and 200) is provided at its lower surface (as seen in FIG. 16) with a cavity 310 of substantially circular cross section, and includes an annularly extending surface portion 312 adjacent cavity 310, as shown. Surface portion 312 is adapted to mate with the upper surface portion of contact arm 26 adjacent aperture 300 and fingers 302 to confine the upper widened portion of tapered insulating member 30 within cavity 310, as will be further described below. It should be noted that pin 30 may also be of cylindrical form (not shown) and include a headed-over or flange portion for reception within cavity 310 to retain the parts in fixed relation.

The parts may be assembled quickly and easily into final operative position in the following manner: the narrow end of tapered, insulating member 30 (the cross sectional configuration of which may be circular in form) is inserted downwardly (as seen in FIG. 16) into aperture 300. Insertion of tapered member 30 within aperture 300 will cause deformable fingers 302 to bend or deflect downwardly (as seen in FIG. 16) into a resilient wedging engagement with the side surfaces of tapered pin 30 to resist further movement of tapered pin 30 in a downward direction. Thereafter, electrical contact 16 is disposed on contact arm 26 (with surface portion 312 abutting the upper surface of contact arm 26) so that the widened upper portion of tapered member 30 is received within cavity 310. Electrical contact 16 is then fixedly secured and electrically connected to the contact arm 26, as by welding. The weld between the contact and contact arm serves the multiple functions of fiedly connecting contact 16 to the contact arm, providing a low-resistance electrical connection therebetween, and also to fixedly and permanently position and mount insulating abutment pin 30 on the contact-carrying member.

The simple and inexpensive method and construction described above dependably secures the parts together and assures that they will remain tightly secured during operation without changing dimensions or deleteriously affecting calibration and operating characteristics of the switch. Further, this construction is advantageous in that it does not add any appreciable mass to the contact arm 26 which tend to minimize or produce a deleterious effect on vibration and shock resistance properties of the switch.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

I claim:

1. A thermostatic switch comprising a housing; a pair of electrical contacts in said housing, one of said electrical contacts being mounted on an electrically conductive, contact-carrying member for movement into and out of engagement with the other of said contacts; said contact carrying member adjacent one end thereof being fixedly cantilever mounted at a single place thereon in said housing; a snap-acting thermostatic member having a dished portion responsible for its snap action; a central portion of said member being provided with an aperture; supporting means disposed in said aperture and having a part thereof engaging one side of said member to loosely support said member; abutment means engaging an opposite side of said member at a portion thereof adjacent the periphery of said member; said supporting means and abutment means positioning said member for movement of at least a part of said member in a direction toward and away from said other of said contacts upon snapping of said member in response to predetermined temperature conditions; said supporting means being intermediate said portion engaging said abutment means and said part of said member; said contact carrying member being provided with an aperture and plurality of spaced annularly arranged deformable fingers extending radially inwardly from the periphery of the aperture; electrically insulating motion-transmitting means disposed intermediate said contact-carrying member and said part of said snap-acting member adjacent the periphery thereof and received within and held by said deformable fingers; means biasing said contact-carrying member for movement toward said snap-acting member and urging said motion-transmitting means into engagement with said part of said snap-acting member on said opposite side thereof; and said other of said contacts being electrically connected to and carried by a second contact-carrying member said second contact carrying member adjacent one end thereof being fixedly cantilever mounted at a single place thereon in said housing and being biased for movement toward said one contact and adapted to flex upon engagement of said contacts to effect a wiping action therebetween.

2. A thermostatic switch as set forth in claim 1 wherein said portion of said snap-acting member adjacent the periphery thereof is provided with an aperture and said abutment means includes a projection disposed in said last-named aperture and an annularly extending shoulder which engages said opposite side of said snap-acting member adjacent said last-named aperture.

3. A device as set forth in claim 1 including an adjustable screw means mounted in said housing in abutting relationship with said second contact carrying member and providing for calibration of said thermostatic switch.

4. A device as set forth in claim 1 wherein said supporting means includes a threaded portion in threaded supportive engagement with said switch housing for adjustably varying the position of the snap acting member for calibration of the device and wherein said thermostatic switch is hermetically sealed within the housing and the threaded portion is accessible exteriorly of the switch for effecting calibration thereof.

5. A thermostatic switch comprising a housing; a pair of electrical contacts in said housing, one of said electrical contacts being mounted on an electrically conductive, contact-carrying member for movement into and out of engagement with the other of said contacts; a snap-acting thermostatic member having a dished portion responsible for its snap action; supporting means engaging one side of said member and loosely supporting said member; abutment means engaging an opposite side of said member at a portion thereof adjacent the periphery of said member; said supporting means and abutment means positioning said member for movement of at least a part of said member in a direction toward and away from said other of said contacts upon snapping of said member in response to predetermined temperature conditions; said supporting means being intermediate said portion engaging said abutment means and said part of said member; a motion-transmitting member carried by said contact-carrying member and positioned for engagement with said part of said snap-acting member adjacent the periphery thereof; said contact-carrying member being provided with an aperture and a plurality of spaced, annularly arranged, deformable fingers extending radially inwardly from the periphery of said aperture; said motion-transmitting member comprising a tapered member formed of electrically insulating material, having a portion thereof disposed in said aperture, deforming said fingers and in wedging engagement therewith; said tapered member including a widened portion extending beyond a surface of said contact-carrying member; said one electrical contact providing a cavity in one surface thereof for reception therewithin of said widened extending portion of said tapered member; and said one electrical contact being electrically connected to said contact-carrying member; means biasing said contact-carrying member for movement toward said snap-acting member and urging said motion-transmitting member into engagement with said part of said snap-acting member on said opposite side thereof.

References Cited

UNITED STATES PATENTS

| | | | |
|---|---|---|---|
| 2,795,678 | 6/1957 | Mertler | 200—138 X |
| 2,958,744 | 11/1960 | Engle | 200—166 X |
| 2,991,341 | 7/1961 | Ulanet | 200—138 |
| 3,005,076 | 10/1961 | Mertler | 200—138 |

BERNARD A. GILHEANY, *Primary Examiner.*

H. BROOME, *Assistant Examiner.*